United States Patent [19]

Anno et al.

[11] Patent Number: 5,271,781
[45] Date of Patent: Dec. 21, 1993

[54] METHOD OF MAKING A THERMOPLASTIC SHEET WITH CEMENT PARTICLES FOR USE ON CONCRETE STRUCTURES

[75] Inventors: Takamitsu Anno, Tokyo; Kanji Katsukawa, Yokohama, both of Japan

[73] Assignee: Koken Kaihatsu Co., Ltd., Tokyo, Japan

[21] Appl. No.: 795,054

[22] Filed: Nov. 20, 1991

Related U.S. Application Data

[63] Continuation-in-part of Ser. No. 518,817, May 4, 1990, abandoned.

[30] Foreign Application Priority Data

Jul. 11, 1989 [JP] Japan .................. 1-178352

[51] Int. Cl.$^5$ .................. E04F 13/00; B32B 31/12
[52] U.S. Cl. .................. 156/71; 156/284; 156/310
[58] Field of Search .................. 156/310, 283, 284, 71, 156/276, 39; 52/445, 449; 428/143; 106/713; 264/35, DIG. 80

[56] References Cited

U.S. PATENT DOCUMENTS

| | | | |
|---|---|---|---|
| 2,373,317 | 4/1945 | Lawson | 156/71 X |
| 2,416,554 | 2/1947 | Voigt | 156/71 X |
| 3,451,884 | 6/1969 | Anno et al. | 156/283 X |
| 4,434,192 | 2/1984 | Neumann | 427/282 |

FOREIGN PATENT DOCUMENTS

| | | | |
|---|---|---|---|
| 227682 | 8/1959 | Australia | 156/276 |
| 3302439 | 7/1984 | Fed. Rep. of Germany | 156/71 |
| 55-139251 | 10/1980 | Japan | 156/279 |

*Primary Examiner*—Michael W. Ball
*Assistant Examiner*—Michele K. Yoder
*Attorney, Agent, or Firm*—Flynn, Thiel, Boutell & Tanis

[57] ABSTRACT

A waterproof sheet for concrete structures comprising a sheet made of a thermoplastic synthetic resin, and powder of cement which is pressed against the sheet and adhered to one side surface or both side surfaces of the sheet. There are also disclosed a method of manufacturing a waterproof sheet for concrete structures and a method of applying a waterproof sheet to the concrete structure.

6 Claims, 2 Drawing Sheets

METHOD OF MAKING A THERMOPLASTIC SHEET WITH CEMENT PARTICLES FOR USE ON CONCRETE STRUCTURES

CROSS-REFERENCE TO RELATED APPLICATION

This application is a continuation-in-part of U.S. patent application Ser. No. 07/518,817, filed May 4, 1990, now abandoned.

BACKGROUND OF THE INVENTION

1. Field of the Invention

The present invention relates to a waterproof sheet for concrete structures.

2. Description of the Prior Art

The conventional waterproof sheet adhered to the surface of a concrete structure with use of an adhesive is liable to be damaged when the concrete structure becomes cracked.

To solve the problem set forth above, the applicants proposed a waterproof sheet for an engineering and construction structure as disclosed in Japanese Patent Publication No. 46-35337. This waterproof sheet is illustrated in FIG. 4 and comprises a sheet made of a thermoplastic synthetic resin and a filament, such as asbestos, glass, polyamide, etc., or powder, such as pumice, vermiculite, slag, glass, etc. The filament or powder is partially embedded into and adhered to the waterproof sheet with a slight interval being provided between the filament or powder and the waterproof sheet. This proposed waterproof sheet does not have the problem that arises in the conventional waterproof sheet employing adhesives. However, there arises the problem that the waterproof sheet is not always adhered to the surface of the concrete structure uniformly and integrally since the proposed waterproof sheet was adhered physically thereto with the filament or powder therebetween.

SUMMARY OF THE INVENTION

It is an object of the present invention to provide a waterproof sheet for concrete structures capable of eliminating adhesives for adhering the waterproof sheet to a concrete structure.

It is a further object of the present invention to provide a waterproof sheet for concrete structures having a sheet and powder pressed against and adhered to the sheet for enabling the waterproof sheet to adhere chemically to the surface of the concrete structure uniformly and integrally utilizing the chemical change of the powder.

To achieve the object of the present invention, the waterproof sheet for concrete structures comprises a sheet made of a thermoplastic synthetic resin and a powder of cement serving as adhesive material of concrete which is pressed against and adhered to the sheet.

The above and other objects, features and advantages of the present invention will become more apparent from the following description taken in conjunction with the accompanying drawings.

DESCRIPTION OF THE PREFERRED EMBODIMENT

A waterproof sheet for concrete structures according to a preferred embodiment will be described with reference to FIGS. 1 to 3.

Figure 1:
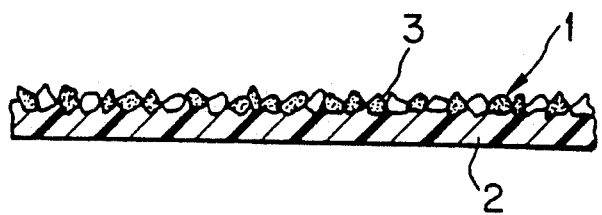
FIG. 1 is a partly enlarged cross sectional view of a waterproof sheet for concrete structures according to a first embodiment of the present invention.

In FIG. 1, the waterproof sheet 1 for concrete structures comprises a sheet 2 made of a thermoplastic synthetic resin and powder 3 of cement which is pressed against the sheet 2 and adhered to one side surface of the sheet 2. Powder 3 of cement may be pressed against and adhered to both side surfaces of the sheet 2.

Figure 2:
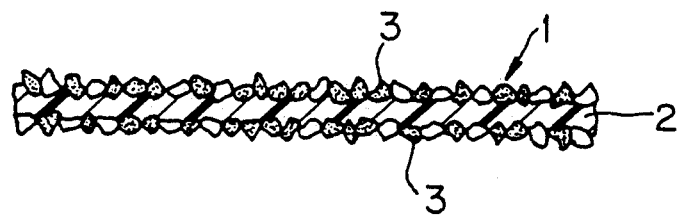
FIG. 2 is a partly enlarged cross sectional view of a waterproof sheet for concrete structures according to a second embodiment of the present invention.

In FIG. 2, powder 3 is pressed against the sheet 2 and adhered to both side surfaces of the waterproof sheet 2.

Figure 3:
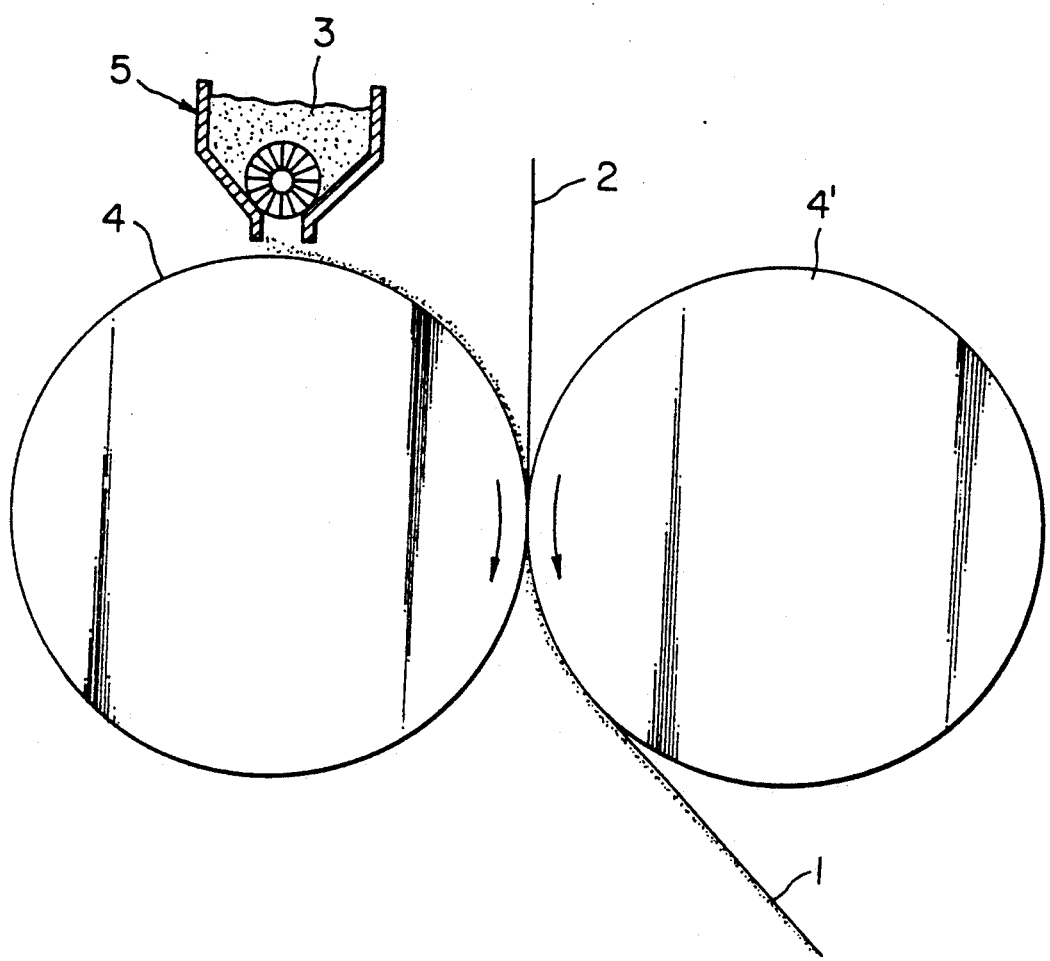
FIG. 3 is a view of assistance in explaining a method of manufacturing the waterproof sheet for concrete structures of FIG. 1.
Figure 4:
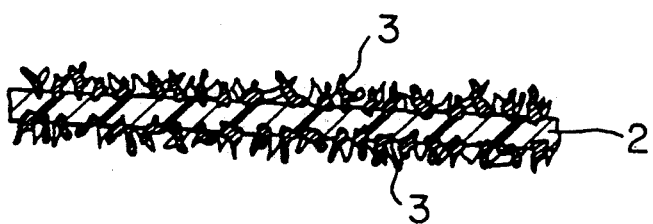
FIG. 4 is a party enlarged cross sectional view of a conventional waterproof sheet for concrete structures.

A method of manufacturing the waterproof sheet 1 for concrete structures is illustrated in FIG. 3. The method comprises the steps of preparing a sheet 2 of a thermoplastic resin by molding, feeding the sheet 2 from the mold toward a portion where a pair of clamping rollers 4, 4' are rotated inward and pressed against each other, feeding powder 3 of cement from a hopper 5 over a circumferential surface of one of the pair of clamping rollers 4, 4', and pressing powder 3 against the sheet 2 by the pair of clamping rollers 4, 4'. The pair of rollers 4, 4' each is provided with rubber on the circumferential surface thereof. Powder 3 of cement may be fed from the hopper 5 over circumferential surfaces of both the pair of clamping rollers 4, 4'.

A method of applying a waterproof sheet to concrete structures comprises the steps of forming a cement paste layer over the surface of the concrete structure, covering the cement paste layer by the sheet 2 in the manner that powder 3 of the sheet 2 is brought into contact with the cement paste layer. Powder 3 is changed chemically by water contained in the cement paste layer whereby the waterproof sheet 1 and the cement paste layer are uniformly and integrally combined with each other. Hence, the concrete structure is waterproofed with certainty.

The sheet 2 covering the cracked portion of the concrete structure can be elastically freely stretched since the cement powder 3 is adhered to the sheet 2 by close spot-contact with the sheet 2, hence it is possible to prevent water from entering into the cracked portion.

Inasmuch as the waterproof sheet according to the present invention comprises only two constituents, namely, the synthetic sheet and the cement powder, it is possible to form a stable waterproof layer, when covering the concrete structure, with a simple structure compared with the waterproof layer formed by the conventional sheet adhered to the surface of the concrete structure by adhesives.

Furthermore, inasmuch as the waterproof sheet is capable of being adhered chemically to the surface of the concrete structure by utilizing the chemical change of the cement powder, the surface of the sheet is solidified integrally with the cement paste layer of the concrete structure, it is possible to adhere the sheet to the surface of the concrete structure more stably, firmly and integrally.

Still furthermore, a water channel is not produced between the sheet and the cement paste layer. In the case that the waterproof sheet having powder at both sides thereof is adhered to the surface of the concrete structure, there does not occur such a phenomenon that a parapet is pushed down by a conventional waterproof protection layer.

Still furthermore, inasmuch as the cement powder is closely adhered to the sheet by spot-contact with the sheet differing from the conventional one in which adhesive is adhered to the sheet by surface-contact with the sheet, the sheet cannot be cut off but is elastically stretched even if the concrete structure becomes cracked, hence the waterproof sheet is closely adhered to the surface of the concrete structure for preventing the water from entering into the cracked portion of the surface of the concrete structure.

A protective mortar layer is formed on the other surface of the sheet which is integrated with the cement paste layer at one surface of the sheet, whereby the protective mortar layer is firmly and integrally combined with the sheet.

The term "cement" as used in the foregoing description and the following claims means any of the various calcined mixtures of clay and limestone which harden when mixed with water. Hydraulic cement is usually mixed with water and with sand, gravel, etc. to form concrete. The most common hydraulic cement is Portland cement.

Although the invention has been described in its preferred form with a certain degree of particularity, it is to be understood that many variations and changes are possible in the invention without departing from the scope thereof.

It is claimed:

1. A method of applying a waterproofing sheet to a concrete structure, comprising the steps of applying a cement paste layer containing water on the surface of the concrete structure, providing a waterproof, thermoplastic synthetic resin sheet and a continuous layer consisting essentially of individual particles or particulate hydraulic cement particles partially embedded in, adhered to and in spot contact with said sheet, said continuous layer being applied on and covering substantially the entirety of one surface of said sheet with said layer being exposed and at least parts of said particles projecting above said surface, covering said cement paste layer with said sheet so that said cement particles on said sheet are in surface contact with said paste layer so that said cement particles chemically react with the water in said paste layer to form a layer of concrete adhesive material which uniformly and integrally adheres said waterproofing sheet to and combines it with the surface of the concrete structure to waterproof the concrete structure, said sheet being elastically stretchable so that it remains in contact with the surface of said concrete structure if the concrete structure becomes cracked.

2. A method as claimed in claim 1 in which said cement is Portland cement.

3. A method as claimed in claim 1 in which said waterproofing sheet with said embedded particles is applied to said concrete structure without using a separate adhesive.

4. A method of applying a waterproofing sheet to a concrete structure, comprising the steps of applying a cement paste layer containing water on the surface of the concrete structure, providing a waterproof, thermoplastic synthetic resin sheet and two continuous layers each consisting essentially of individual particles of particulate hydraulic cement particles partially embedded in, adhered to and in spot contact with said sheet, said continuous layers being applied on and covering substantially the entireties of the surfaces of said sheet with said layers being exposed and at least parts of said particles projecting above said surfaces, covering said cement paste layer with said sheet so that said cement particles on one surface of said sheet are in surface contact with said paste layer so that said cement particles chemically react with the water in said paste to form a layer of concrete adhesive material which uniformly and integrally adheres said waterproofing sheet to and combines it with the surface of the concrete structure to waterproof the concrete structure, said sheet being elastically stretchable so that it remains in contact with the surface of said concrete structure if the concrete structure becomes cracked, and forming a protective mortar layer on the other surface of said sheet which mortar layer is integrally combined with said sheet.

5. A method as claimed in claim 4 in which said cement is Portland cement.

6. A method as claimed in claim 4 in which said waterproofing sheet with said embedded particles is applied to said concrete structure without using a separate adhesive.

* * * * *